(12) United States Patent
Ito

(10) Patent No.: US 10,112,574 B2
(45) Date of Patent: Oct. 30, 2018

(54) BELT FITTING

(71) Applicant: Enshu CO., Ltd, Iwata-shi, Shizuoka (JP)

(72) Inventor: Tadao Ito, Iwata (JP)

(73) Assignee: ENSHU CO., LTD., Shizuoka (JP)

( * ) Notice: Subject to any disclaimer, the term of this patent is extended or adjusted under 35 U.S.C. 154(b) by 0 days.

(21) Appl. No.: 14/421,147

(22) PCT Filed: Jan. 27, 2014

(86) PCT No.: PCT/JP2014/051721
§ 371 (c)(1),
(2) Date: Feb. 12, 2015

(87) PCT Pub. No.: WO2015/111226
PCT Pub. Date: Jul. 30, 2015

(65) Prior Publication Data
US 2016/0039386 A1    Feb. 11, 2016

(51) Int. Cl.
*B60R 22/18* (2006.01)
(52) U.S. Cl.
CPC .................... *B60R 22/18* (2013.01)
(58) Field of Classification Search
CPC ........................................ B60R 22/18
USPC ................ 297/463.1; 280/808; 29/897.2
See application file for complete search history.

(56) References Cited

U.S. PATENT DOCUMENTS 4,582,340 A  *  4/1986  Fohl ..................... B60R 22/24
                                                    280/808
4,618,165 A     10/1986  Seifert et al.
(Continued)

FOREIGN PATENT DOCUMENTS

CN           1135433 A       11/1996
DE     102004041665 A1        3/2006
(Continued)

OTHER PUBLICATIONS

English language translation of the following: Office action dated Jun. 30, 2015 from the JPO in a Japanese patent application corresponding to the instant patent application. This office action translation is submitted now in order to supplement the understanding of the cited references which are being disclosed in the instant Information Disclosure Statement.
(Continued)

*Primary Examiner* — Timothy J Brindley
(74) *Attorney, Agent, or Firm* — SOLARIS Intellectual Property Group, PLLC

(57) ABSTRACT

In an anchor (10), an insertion hole (42) is formed piercing through an anchor main body (36), and a belt is inserted through the insertion hole (42). A projection (44) is formed at the anchor main body (36) around the entire periphery of the insertion hole (42), and the projection (44) configures an outer peripheral face of the insertion hole (42). The projection (44) projects out toward the radial direction outer side of the insertion hole (42). The surface area of a portion configured by the projection (44) at the outer peripheral face of the insertion hole (42) can accordingly be increased, and the contact surface area of the belt with the outer peripheral face of the insertion hole (42) can be increased, even when the plate thickness dimension of the anchor main body (36) is reduced. This thereby enables the plate thickness dimension of the anchor main body (36) to be reduced.

2 Claims, 5 Drawing Sheets

(56) References Cited

U.S. PATENT DOCUMENTS

| | | | | |
|---|---|---|---|---|
| 5,513,880 | A * | 5/1996 | Ohira | B60R 22/24 280/808 |
| 5,899,499 | A | 5/1999 | Ito | |
| 5,918,903 | A * | 7/1999 | Ito | B60R 22/24 280/801.1 |
| 6,138,328 | A * | 10/2000 | Iseki | B60R 22/24 24/197 |
| 6,324,730 | B1 * | 12/2001 | Iseki | B60R 22/24 24/197 |
| 6,467,850 | B1 * | 10/2002 | Kawai | B60R 22/24 29/458 |
| 6,526,630 | B2 * | 3/2003 | Suzuki | A44B 11/2561 24/197 |
| 6,662,426 | B2 * | 12/2003 | Ito | B60R 22/18 29/527.2 |
| 6,715,793 | B2 * | 4/2004 | Okubo | B60R 22/24 24/197 |
| 7,325,835 | B2 * | 2/2008 | Janz | B60R 22/24 280/801.1 |
| 7,578,525 | B2 * | 8/2009 | You | B60R 22/24 280/801.1 |
| 7,597,358 | B2 * | 10/2009 | Kim | B60R 22/18 280/801.1 |
| 2007/0040372 | A1 | 2/2007 | Tabata et al. | |
| 2015/0251626 | A1 | 9/2015 | Board et al. | |

FOREIGN PATENT DOCUMENTS

| | | |
|---|---|---|
| DE | 102004061434 A1 | 6/2006 |
| JP | H05-028763 U | 4/1993 |
| JP | H8-188117 A | 7/1996 |
| JP | H08-198053 A | 8/1996 |
| JP | H8-301068 A | 11/1996 |
| JP | 3281226 B | 5/2002 |
| JP | 3281308 | 5/2002 |
| JP | 3485714 | 1/2004 |
| JP | 2007-050824 A | 3/2007 |
| JP | 2012-171587 | 9/2012 |

OTHER PUBLICATIONS

English language translation of the following: Office action dated Jul. 26, 2016 from the JPO in a Japanese patent application corresponding to the instant patent application. This office action translation is submitted now in order to supplement the understanding of the cited reference which is being disclosed in the instant information Disclosure Statement.

Extended European Search Report dated Aug. 25, 2016, issued in corresponding EP Patent Application.

English language translation of the following: Office action dated Jun. 3, 2016 from the SIPO in a Chinese patent application corresponding to the instant patent application. This office action translation is submitted now in order to supplement the understanding of the cited references which are being disclosed in the instant Information Disclosure Statement.

English language translation of the following: Office action dated Sep. 6, 2016 from the JPO in a Japanese patent application No. 2014-561607 corresponding to the instant patent application. This office action translation is submitted now in order to supplement the understanding of the cited reference which is being disclosed in the instant Information Disclosure Statement.

* cited by examiner

BELT FITTING

TECHNICAL FIELD

The present invention relates to a belt fitting through which a belt of a vehicle seatbelt device is inserted, with the belt fitting attached to the vehicle.

BACKGROUND ART

In a metal belt fitting described in Japanese Patent No. 3281226, an elongated hole is formed to a base plate, and a belt of a seatbelt device is inserted through the elongated hole. A ridge is formed at the periphery of the elongated hole of the base plate, and the ridge configures an outer peripheral face of the elongated hole. The material of the metal belt fitting is high tension steel plate.

In cases in which the plate thickness dimension of the base plate of the metal belt fitting is reduced, the surface area of a portion configured by the base plate at the outer peripheral face of the elongated hole is reduced, and since the surface area of the outer peripheral face of the elongated hole is reduced, the contact surface area of the belt with the outer peripheral face of the elongated hole is reduced.

SUMMARY OF INVENTION

Technical Problem

In consideration of the above circumstances, an object of the present invention is to obtain a belt fitting enabling the plate thickness dimension of a main body member to be reduced.

Solution to Problem

A belt fitting of a first aspect of the invention includes a main body member that is formed with an insertion hole through which a belt of a vehicle seatbelt device is inserted and that is attached to a vehicle, and a projecting portion that is provided at the main body member, that configures an outer peripheral face of the insertion hole, and that projects out toward a radial direction outer side of the insertion hole.

A belt fitting of a second aspect of the invention is the belt fitting of the first aspect of the invention, wherein the outer peripheral face of the insertion hole curves in a convex shape toward a side of the insertion hole.

A belt fitting of a third aspect of the invention is the belt fitting of the first aspect or the second aspect of the invention, wherein the belt fitting is manufactured by press processing carbon steel to form the main body member, the insertion hole, and the projecting portion, and then heat treating the carbon steel.

Advantageous Effects of Invention

In the belt fitting of the first aspect of the invention, the insertion hole is formed to the main body member attached to the vehicle, and the belt of the vehicle seatbelt device is inserted through the insertion hole. The projecting portion is provided at the main body member, and the projecting portion configures the outer peripheral face of the insertion hole.

The projecting portion projects out toward the radial direction outer side of the insertion hole. This enables the surface area of the portion of the outer peripheral face of the insertion hole configured by the projecting portion to be increased. The surface area of the outer peripheral face of the insertion hole can accordingly be increased, and the contact surface area of the belt with the outer peripheral face of the insertion hole can be increased, even when the plate thickness dimension of the main body member is reduced. This enables the plate thickness dimension of the main body member to be reduced.

In the belt fitting of the second aspect of the invention, the outer peripheral face of the insertion hole curves in the convex shape toward the side of the insertion hole. Damage to the belt can thereby be effectively suppressed.

In the belt fitting of the third aspect of the invention, the belt fitting is manufactured by press processing carbon steel to form the main body member and the projecting portion, and then heat treating the carbon steel. The main body member, the insertion hole, and the projecting portion can thereby be easily formed by press processing to form the main body member, the insertion hole, and the projecting portion prior to heat treating the carbon steel. By then heat treating the carbon steel, the strength of the main body member and the projecting portion can be effectively increased.

DESCRIPTION OF EMBODIMENTS

Figure 1:
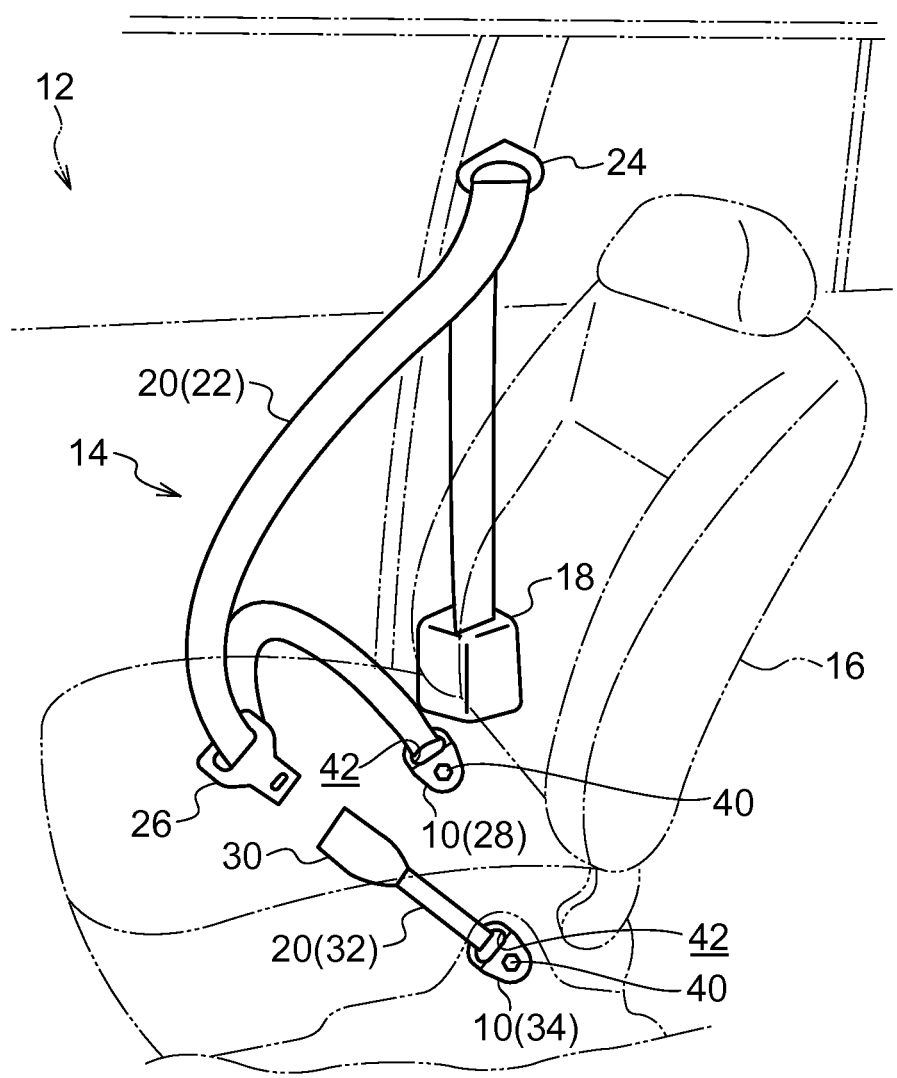
FIG. 1 is a perspective view illustrating relevant portions of a vehicle of an exemplary embodiment of the present invention, as viewed diagonally from the front left of the vehicle.
Figure 2:
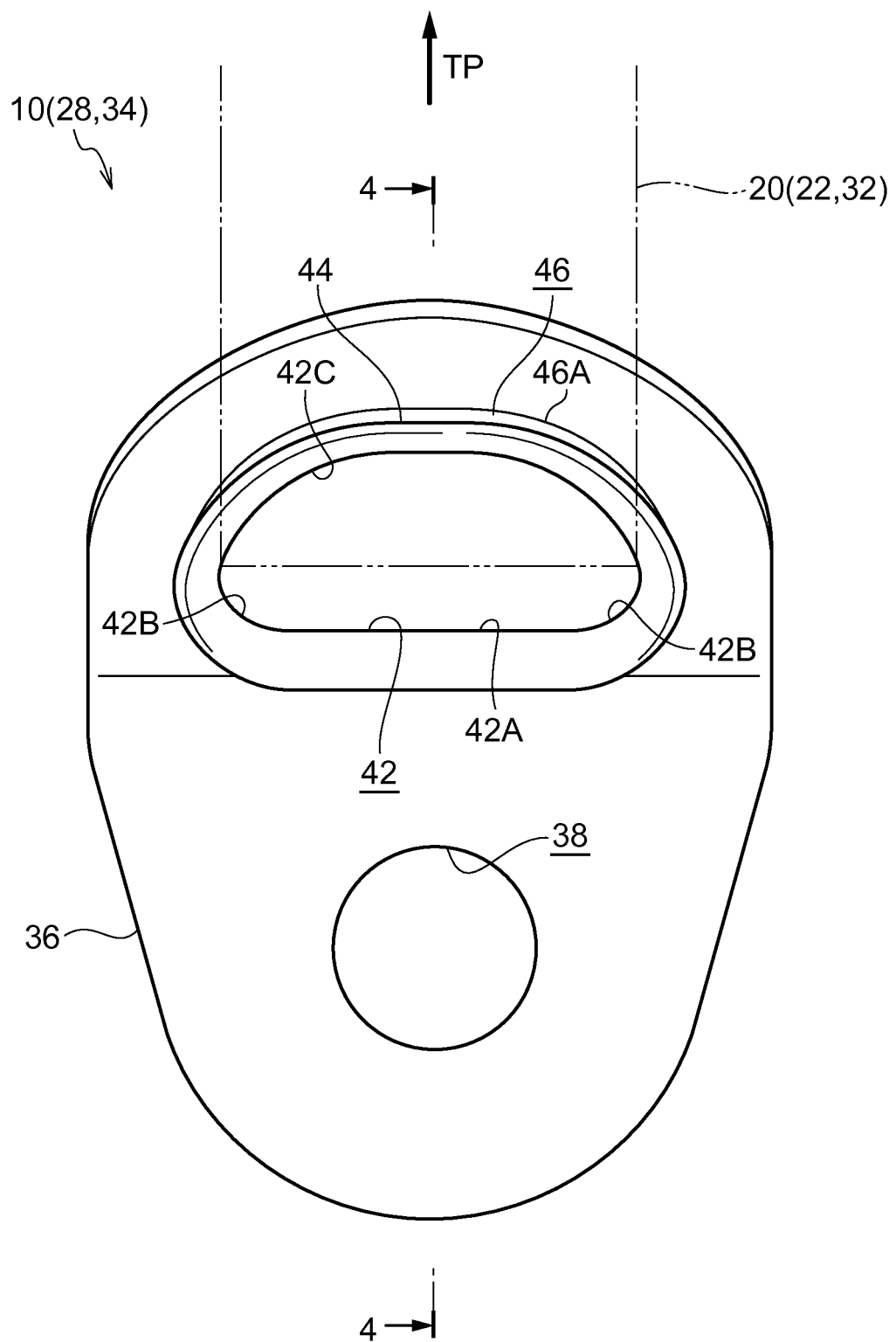
FIG. 2 is a face-on view illustrating an anchor according to the exemplary embodiment of the present invention.
Figure 3:
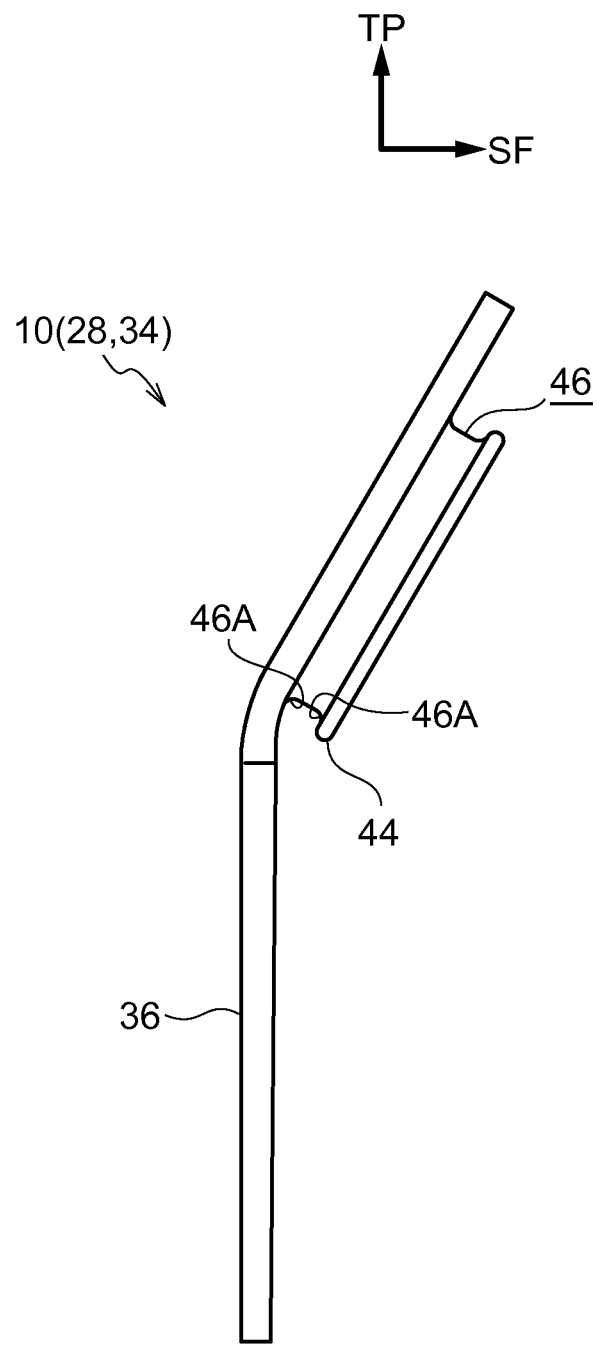
FIG. 3 is a side view illustrating the anchor according to the exemplary embodiment of the present invention.
Figure 4:
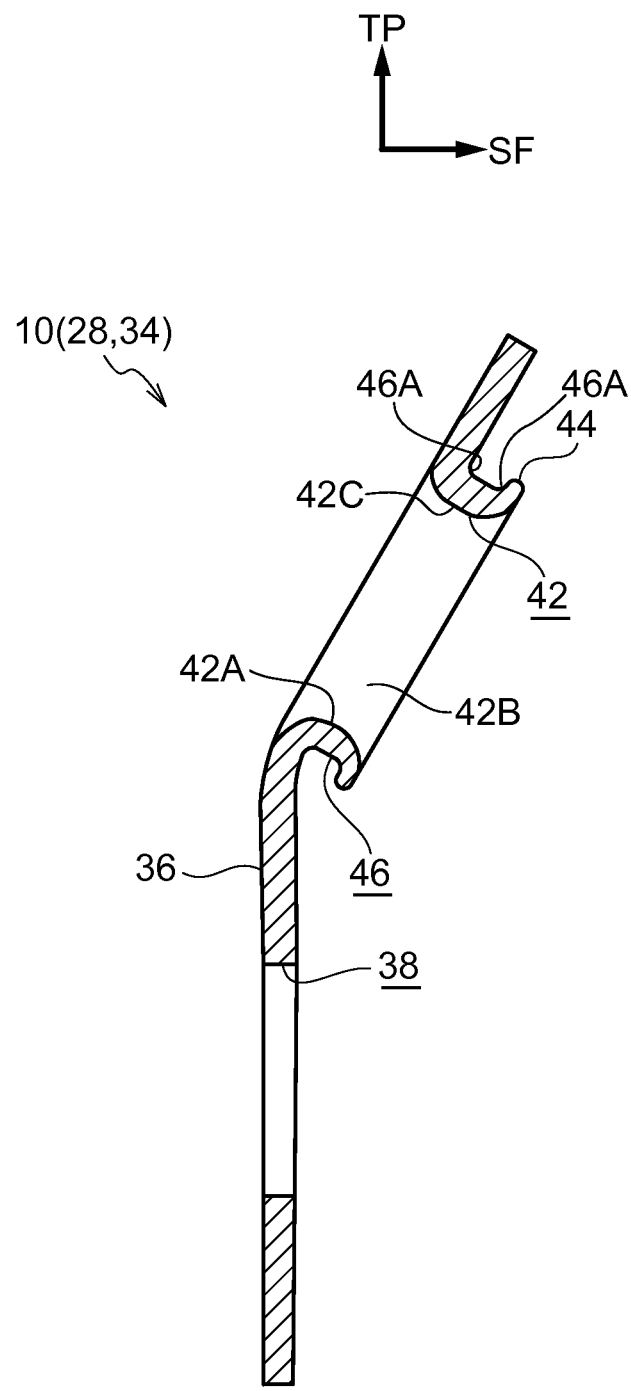
FIG. 4 is a cross-section (a cross-section taken along line 4-4 in FIG. 2) illustrating the anchor according to the exemplary embodiment of the present invention.
Figure 5:
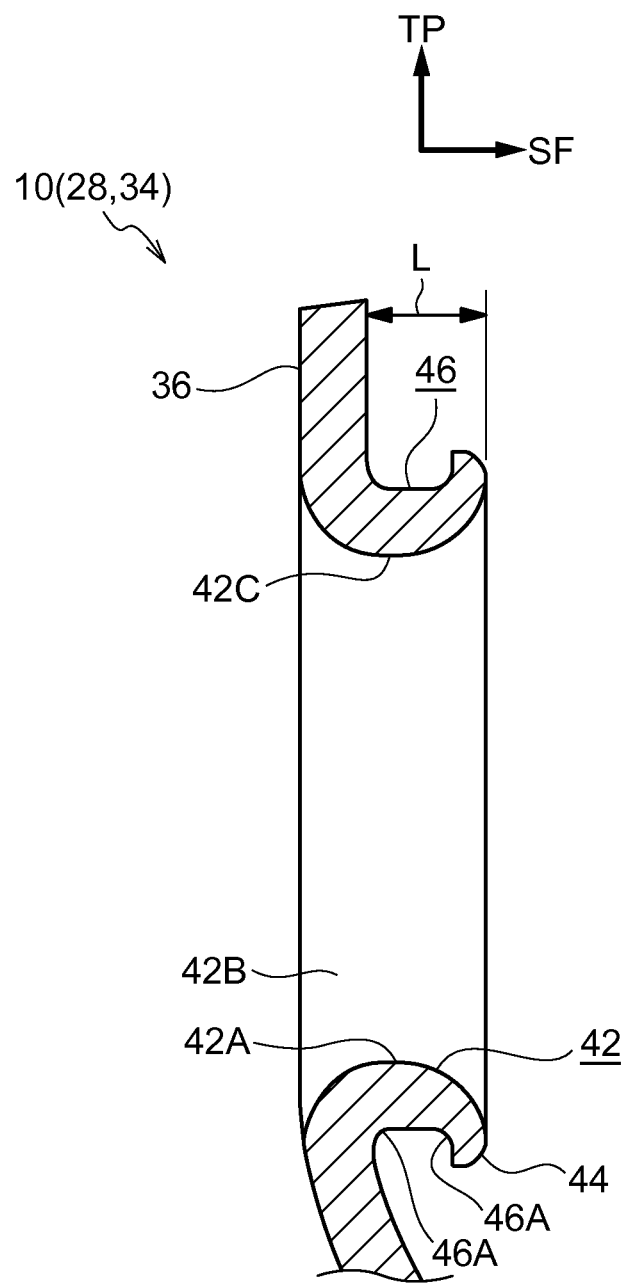
FIG. 5 is a cross-section illustrating relevant portions of the anchor according to the exemplary embodiment of the present invention.

FIG. 2 is a face-on view of an anchor 10 serving as a belt fitting according to an exemplary embodiment of the present invention, and FIG. 3 is a side view of the anchor 10. FIG. 1 is a perspective view illustrating relevant portions of a vehicle 12 (an automobile) applied with the anchor 10, as viewed diagonally from the front left of the vehicle. In the drawings, the arrow SF indicates the front side of the anchor 10, and the arrow TP indicates the leading end side of the anchor 10.

As illustrated in FIG. 1, the anchor 10 according to the present exemplary embodiment is employed in a seatbelt device 14 of the vehicle 12, and the seatbelt device 14 is installed to a seat 16 for seating an occupant (such as a driver) inside the vehicle cabin.

The seatbelt device 14 includes a stowing device 18 (a take-up device), and the stowing device 18 is attached to the vehicle body (or may be attached to the seat 16) at the vehicle width direction outer side and lower side of the seat 16. An elongated belt shaped seatbelt 22 (webbing), configuring a belt 20, is taken-up and stored in the stowing device 18 from a base end side thereof, and the stowing device 18 causes a biasing force toward the take-up direction to act on the seatbelt 22.

The seatbelt 22 is movably inserted through a through-anchor 24 further to the leading side than the stowing device 18, and the through-anchor 24 is attached to the vehicle body (or may be attached to the seat 16) at the vehicle width direction outer side and upper side of the seat 16, so as to be capable of swinging. The seatbelt 22 is movably inserted through a tongue 26 further to the leading end side than the through-anchor 24.

The leading end of the seatbelt 22 is attached to a belt anchor 28 configuring the anchor 10, and the belt anchor 28 is attached (fixed) to the vehicle body (or may be attached to the seat 16) at the vehicle width direction outer side and lower side of the seat 16.

The seatbelt device 14 includes a buckle 30, and a leading end of an elongated belt shaped attachment belt 32 (webbing) configuring the belt 20 is attached to the buckle 30. A base end of the attachment belt 32 is attached to an attachment anchor 34 configuring the anchor 10, and the attachment anchor 34 is attached (fixed) to the vehicle body (or may be attached to the seat 16) at the vehicle width direction inner side and lower side of the seat 16.

The tongue 26 is attachable to, and detachable from, the buckle 30, and the seatbelt 22 is fastened over the occupant seated in the seat 16 by attaching the tongue 26 to the buckle 30. When this is performed, a portion of the seatbelt 22 between the through-anchor 24 and the tongue 26 (a shoulder belt portion) spans across the upper body of the occupant in a diagonal direction, and a portion of the seatbelt 22 between the tongue 26 and the belt anchor 28 (a lap belt portion) spans in the horizontal direction across the waist of the occupant. The occupant can be restrained to the seat 16 during an emergency in the vehicle (such as during a collision) by the stowing device 18 locking pull-out of the seatbelt 22.

The anchor 10 (the belt anchor 28 and the attachment anchor 34) according to the present exemplary embodiment is made from a material referred to as a carbon steel (such as boron steel), and the strength of the anchor 10 is increased by heat treating the carbon steel.

As illustrated in FIG. 2 to FIG. 5, the anchor 10 includes a plate shaped anchor main body 36, serving as a main body member. The plate thickness dimension of the anchor main body 36 is smaller (at 1.6 mm, for example) than the plate thickness dimension of an anchor main body hitherto (at 3.2 mm, for example). The anchor main body 36 is formed by press processing prior to heat treating the carbon steel. A leading end side portion of the anchor main body 36 (one length direction side portion) curves with respect to a base end side portion of the anchor main body 36 (the other length direction side portion), and the leading end side portion of the anchor main body 36 slopes in a direction toward the front side of the anchor main body 36 on progression toward the leading end side thereof.

A circular shaped attachment hole 38 is formed piercing through the base end side portion of the anchor main body 36. The attachment hole 38 is formed by press processing prior to heat treating the carbon steel. An attachment bolt 40 pierces through and is fitted into the attachment hole 38 (see FIG. 1), and the anchor 10 is attached to the vehicle body by fastening the attachment bolt 40 to the vehicle body, and clamping the periphery of the attachment hole 38 of the anchor main body 36 between the head of the attachment bolt 40 and the vehicle body.

An insertion hole 42, that is substantially elliptical shaped in face-on view, is formed piercing through the leading end side portion of the anchor main body 36. The insertion hole 42 is formed by press processing prior to heat treating the carbon steel. The insertion hole 42 has its length direction in the width direction of the anchor main body 36. An outer peripheral face of the insertion hole 42 is formed with a base end 42A formed in a straight line in face-on view at the base end side of the anchor main body 36, neighboring portions 42B each formed in a concave curved line in face-on view neighboring the base end 42A, and a leading end portion 42C formed at the leading end side of the anchor main body 36 in a curved shape that is concave toward the leading end side of the anchor main body 36 in face-on view.

A substantially elliptical cylinder shaped projecting portion 44 (a flange) is formed running around the entire periphery of the insertion hole 42 at the leading end side portion of the anchor main body 36. The projecting portion 44 is formed by press processing prior to heat treating the carbon steel. The projecting portion 44 projects out toward the front side of the anchor main body 36, and the projecting portion 44 increases the surface area of the portion of the anchor 10 forming the insertion hole 42, and strengthens the portion of the anchor 10 forming the insertion hole 42. An inner peripheral face of the projecting portion 44 configures the outer peripheral face of the insertion hole 42, and the insertion hole 42 is enlarged in the plate thickness direction of the anchor main body 36 by the projecting portion 44. In cases in which the plate thickness dimension of the anchor main body 36 is reduced, the projection dimension of the projecting portion 44 can be increased, and a dimension L (see FIG. 5) of the projecting portion 44 in the plate thickness direction of the anchor main body 36 increased (to 4.4 mm, for example).

A projection base end side portion of the projecting portion 44 projects out in the plate thickness direction of the anchor main body 36, and a projection leading end side portion of the projecting portion 44 projects (curls) out toward the radial direction outer side of the insertion hole 42, such that the thickness dimension of the projecting portion 44 is, for example, no more than the plate thickness dimension of the anchor main body 36. A concave portion 46, with a substantially rectangular cross-section, is formed to a portion of the projecting portion 44 at the opposite side to the insertion hole 42 (the radial direction outer side of the insertion hole 42). The concave portion 46 opens toward the opposite side to the insertion hole 42, and each corner portion 46A at an outer peripheral face of the concave portion 46 curves in a concave shape. A cross-section of the outer peripheral face of the insertion hole 42 (including the inner peripheral face of the projecting portion 44) forms a substantially semi-circular arc shape, and the outer peripheral face of the insertion hole 42 curves in a convex shape toward the side of the insertion hole 42 (the radial direction inner side of the insertion hole 42).

The belt 20 (the seatbelt 22 or the attachment belt 32) is inserted through the insertion hole 42, and the belt 20 is folded back on itself at the position of insertion into the insertion hole 42 and stitched together in a superimposed state in the vicinity of the insertion hole 42 insertion position. The belt 20 is thereby attached to the anchor 10. When load from the occupant acts on the seatbelt 22 in a state in which the stowing device 18 has locked pull-out of the seatbelt 22 during the vehicle emergency (such as the collision), the belt 20 (the seatbelt 22 and the attachment belt 32) makes face-to-face contact with the leading end portion 42C of the outer peripheral face of the insertion hole 42, in a state in which the belt 20 is flexed along the leading end portion 42C at the outer peripheral face of the insertion hole 42 due to being pulled by the occupant.

Explanation follows regarding operation of the present exemplary embodiment.

In the anchor 10 with the above configuration, the attachment hole 38 is formed piercing through the anchor main body 36, and the anchor 10 is attached to the vehicle body at the attachment hole 38.

The insertion hole 42 is also formed piercing through the anchor main body 36, the projecting portion 44 is formed to the anchor main body 36 around the entire periphery of the insertion hole 42, and the inner peripheral face of the projecting portion 44 configures the outer peripheral face of the insertion hole 42. Furthermore, the belt 20 is attached to the anchor 10 in a state of insertion through the insertion hole 42.

Not only does the projection base end side portion of the projecting portion 44 project out in the plate thickness direction of the anchor main body 36, but the projection leading end side portion of the projecting portion 44 also projects out toward the radial direction outer side of the insertion hole 42. This enables the surface area of the portion of the outer peripheral face of the insertion hole 42 configured by the inner peripheral face of the projecting portion 44 to be increased. The surface area of the outer peripheral face of the insertion hole 42 can accordingly be increased, even when the plate thickness dimension of the anchor main body 36 is reduced. The contact surface area of the belt 20 with the outer peripheral face of the insertion hole 42 can according be increased, enabling damage (wear to or snapping of) the belt 20 to be suppressed, so that the plate thickness dimension of the anchor main body 36 can be reduced, and the weight of the anchor 10 can be lowered.

Even when the plate thickness dimension of the anchor main body 36 is reduced, the projection dimension of the projecting portion 44 can be increased. This enables the surface area of the portion of the outer peripheral face of the insertion hole 42 configured by the inner peripheral face of the projecting portion 44 to be effectively increased, and the surface area of the outer peripheral face of the insertion hole 42 to be effectively increased. The contact surface area of the belt 20 with the outer peripheral face of the insertion hole 42 can according be effectively increased, enabling damage (wear to or snapping of) the belt 20 to be effectively suppressed.

The outer peripheral face of the insertion hole 42 (including the inner peripheral face of the projecting portion 44) curves in a convex shape toward the side of the insertion hole 42. This enables damage (wear to or snapping of) the belt 20 to be even more effectively suppressed.

The anchor 10 is manufactured by heat treating the carbon steel after press processing carbon steel to form the anchor main body 36, the attachment hole 38, the insertion hole 42, and the projecting portion 44.

The anchor main body 36, the attachment hole 38, the insertion hole 42, and the projecting portion 44 can be easily formed due to press processing the carbon steel to form the anchor main body 36, the attachment hole 38, the insertion hole 42, and the projecting portion 44 prior to heat treatment. In particular, the projecting portion 44 can be easily formed to the anchor main body 36, in contrast to cases in which ultra high tensile steel plate is employed as the material of the anchor 10 in order to reduce the weight (reduce plate thickness) of the anchor 10.

By heat treating the carbon steel thereafter, the strength of the anchor 10 (the anchor main body 36 and the projecting portion 44) can be effectively increased, even when there is a small plate thickness dimension of the anchor main body 36 and small thickness dimension of the projecting portion 44. In particular, even when the belt 20 (the seatbelt 22 and the attachment belt 32) is pulled by the occupant in a state in which the stowing device 18 has locked pull-out of the seatbelt 22 during a vehicle emergency (such as a collision), damage to the anchor 10 (the anchor main body 36, the attachment hole 38, the insertion hole 42, and the projecting portion 44) due to load input to the anchor 10 from the belt 20 can accordingly be suppressed.

In the present exemplary embodiment, the projection base end side portion of the projecting portion 44 is made to project out in the plate thickness direction of the anchor main body 36. However, the projection base end side portion of the projecting portion 44 may be made to project out toward the radial direction outer side of the insertion hole 42.

In the present exemplary embodiment, the projecting portion 44 projects out from the front side of the anchor main body 36. However, it is sufficient that the projecting portion 44 projects out from at least one of the front side or the back side of the anchor main body 36.

In the present exemplary embodiment, the projecting portion 44 is formed to the anchor main body 36 around the entire periphery of the insertion hole 42. However, the projecting portion 44 may be formed to the anchor main body 36 at one peripheral direction portion of the insertion hole 42 (particularly a portion contacting the belt 20 during a vehicle emergency (such as a collision)).

EXPLANATION OF THE REFERENCE NUMERALS 10 anchor (belt fitting)
12 vehicle
14 seatbelt device
20 belt
36 anchor main body (main body member)
42 insertion hole
44 projecting portion

The invention claimed is:

1. A belt fitting comprising:
   a main body member that is formed with an insertion hole through which a belt of a vehicle seatbelt device is inserted, and that is attached to the vehicle at a portion that is not formed with the insertion hole; and
   a projecting portion that is provided integrally at the main body member, that forms an outer peripheral face of the insertion hole, and that a leading side portion of the projecting portion extends out toward a radial direction outer side of the insertion hole and is apart from a base side portion of the projecting portion in an entire circumferential direction of the insertion hole; wherein
   a straight portion is provided in the base side portion of the projecting portion at a side face opposite the insertion hole along the entire circumferential direction of the insertion hole, the straight portion being straight along a plane perpendicular to a circumferential direction of the insertion hole.

2. The belt fitting of claim 1, wherein the outer peripheral face of the insertion hole curves with a convex shape toward the insertion hole.

* * * * *